US010880376B1

(12) United States Patent
Green

(10) Patent No.: US 10,880,376 B1
(45) Date of Patent: Dec. 29, 2020

(54) DOWNLOADING CHUNKS OF AN OBJECT FROM A STORAGE SERVICE WHILE CHUNKS OF THE OBJECT ARE BEING UPLOADED

(71) Applicant: Amazon Technologies, Inc., Seattle, WA (US)

(72) Inventor: David Green, La Canada, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/609,954

(22) Filed: May 31, 2017

(51) Int. Cl.
G06F 15/16 (2006.01)
H04L 29/08 (2006.01)

(52) U.S. Cl.
CPC .......... H04L 67/1097 (2013.01); H04L 67/16 (2013.01); H04L 67/34 (2013.01)

(58) Field of Classification Search
CPC ............................ H04L 67/1097; H04L 67/16
See application file for complete search history.

(56) References Cited

U.S. PATENT DOCUMENTS

| 2004/0080505 | A1* | 4/2004 | Miyaji ..................... H04N 5/76 345/418 |
| 2016/0173566 | A1* | 6/2016 | Yao .......................... H04L 67/06 709/224 |
| 2017/0286698 | A1* | 10/2017 | Shetty ................. H04L 67/1097 |

OTHER PUBLICATIONS

Multipart Upload Overview, Amazon Simple Storage Service, Amazon Web Services, http://docs.aws.amazon.com/AmazonS3/latest/dev/mpuoverview.html.
Amazon S3 Transfer Acceleration, Amazon Web Services, 2017, http://docs.aws.amazon.com/AmazonS3/latest/dev/transfer-acceleration.html.

\* cited by examiner

*Primary Examiner* — Hua Fan
(74) *Attorney, Agent, or Firm* — Lee & Hayes, P.C.

(57) ABSTRACT

A network storage service is disclosed that is configured to provide functionality for enabling individual chunks of an object to be downloaded from the storage service while other chunks of the same object are being uploaded to the storage service. The storage service maintains status data for uploads of storage objects identifying chunks that have completed uploading, chunks that are currently uploading, and chunks that are pending upload. The storage service exposes the status data to client computing devices such as, for instance, via a network services application programming interface. The client computing devices can utilize the status data to download chunks of an object as soon as the chunks have been completely uploaded to the storage service. The storage service can be accessed by way of a content distribution network point of presence in some configurations.

20 Claims, 11 Drawing Sheets

US 10,880,376 B1

DOWNLOADING CHUNKS OF AN OBJECT FROM A STORAGE SERVICE WHILE CHUNKS OF THE OBJECT ARE BEING UPLOADED

BACKGROUND

Network-based storage services exist that allow data to be stored and accessed over wide area networks ("WANs"), such as the Internet. For example, and without limitation, a network-based storage service can allow client computing devices to upload objects for storage by the storage service. Such a service can also provide functionality for allowing client computing devices to download previously uploaded and stored objects. Network-based storage services can also provide other types of functionality, such as backing up objects, copying objects, and others.

Network-based storage services such as those described briefly above require that uploads of objects be completed before downloads of the objects are permitted. This requirement significantly increases the total amount of time required to both upload and download an object. For example, a receiver might require immediate access to an object as soon as it is available at a storage service. Currently, however, the receiver must wait until the object has been completely uploaded to the storage service prior to initiating a download of the object. This requirement can impose a significant delay before the receiver can complete a download of the object, particularly where the object is multiple hundreds of gigabytes or even terabytes in size.

The disclosure made herein is presented with respect to these and other considerations.

DETAILED DESCRIPTION

Figure 1:
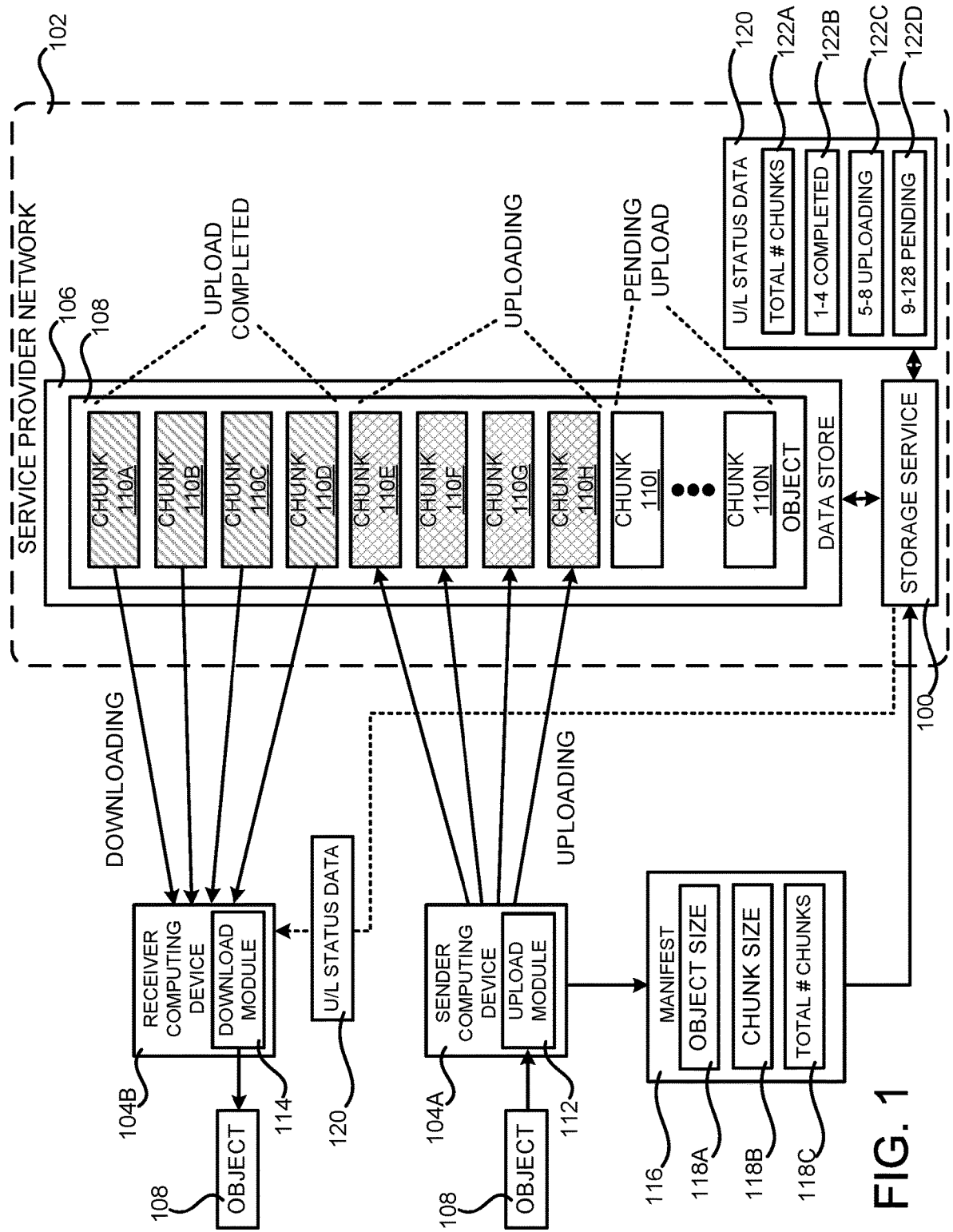
FIG. 1 is a software and network architecture diagram showing aspects of the operation of a storage service configured to provide functionality for enabling chunks of an object to be downloaded while other chunks of the object are being uploaded, according to one particular configuration.

The following detailed description is directed to a network storage service that provides functionality for enabling chunks of an object to be downloaded at the same time that other chunks of the same object are being uploaded. Through an implementation of the disclosed technologies, clients of the storage service can download chunks of an object while other clients are uploading other chunks of the same object. In this manner, downloads of objects stored by the storage service can be completed in much less time than in implementations where uploading of all of the chunks of an object must be completed prior to downloading the object. Technical benefits other than those specifically mentioned herein can also be realized through an implementation of the disclosed technologies.

In order to provide the functionality described briefly above, a network storage service is disclosed that executes in a service provider network. The storage service provides functionality for allowing clients (which might be referred to herein as "sender computing devices") to upload objects for storage by the storage service. The storage service also provides functionality for allowing clients (which might be referred to herein as "receiver computing devices") to download previously uploaded and stored objects.

The storage service can maintain status data for uploads of storage objects. The status data identifies chunks of an object that have completed uploading, chunks of the object that are currently uploading, and chunks of the object that are pending upload. The storage service can also expose the status data to clients through various types of interfaces such as, for instance, via a network services application programming interface ("API") or command line interface ("CLI"). Client computing devices can request the upload status data from the storage service by way of an interface, and utilize the upload status data to select and download chunks of an object from the storage service as soon as the chunks have been completely uploaded to the storage service.

The storage service can be accessed by way of a content distribution network ("CDN") point of presence ("POP") in some configurations. Additional details regarding the various components and processes described briefly above for enabling chunks of an object to be downloaded simultaneously with the uploading of other chunks of the object to the storage service will be presented below with regard to FIGS. 1-9.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram showing aspects of the operation of a storage service configured to provide functionality for enabling chunks of an object to be downloaded while other chunks of the object are being uploaded, according to one particular configuration. As shown in FIG. 1, the storage service 100 operates in a service provider network 102 in one particular configuration.

The service provider network 102 is a computing network configured to provide computing resources (which might be referred to simply as "resources") on a permanent or an as-needed basis. Among other types of functionality, the computing resources provided by the service provider network 102 can be utilized to implement various types of network services. The computing resources provided by the service provider network 102 can include data processing resources like data storage resources, virtual machine ("VM") instances, networking resources, data communication resources, network services, and other types of computing resources.

A user of the service provider network 102 can utilize an appropriate computing system, such as the computing devices 104A and 104B, to communicate with the service provider network 102 over an appropriate data communications network (not shown in FIG. 1). In the example shown in FIG. 1, for instance, the computing device 104A is being utilized to upload data to the storage service 100 (accordingly, the computing device 104A might be referred to herein as the "sender computing device"). Also in the example shown in FIG. 1, the computing device 104B is being utilized to download data from the storage service 100 (accordingly, the computing device 104B might be referred to herein as the "receiver computing device").

A user of the service provider network 102 can configure various aspects of the operation of the computing resources provided by the service provider network 102, or to otherwise control any computing resources being utilized. For example, and without limitation, a computing system 104A or 104B utilized by a user of the service provider network 102 can be used to purchase computing resources in the service provider network 102, to configure aspects of the operation of the computing resources, to access and utilize functionality provided by the various services and systems described herein, and/or to perform other types of functionality with regard to the operation of the computing resources provided by the service provider network 102.

The computing devices utilized to configure and monitor the resources in the service provider network 102 (e.g. the computing devices 104A and 104B) can be any type of computing device capable of connecting to the service provider network 102 via a suitable data communications network (not shown in FIG. 1) such as, but not limited to, a laptop or desktop computer, a tablet computing device, a server computer, or a smartphone.

Administrative users employed by the owner or operator of the service provider network 102, such as administrators managing the operation of the service provider network 102, can also connect with, manage, and utilize resources provided by network services executing within the service provider network 102 in a similar fashion. Additional details regarding the configuration and operation of the service provider network 102 will be provided below with regard to FIGS. 6-9.

As discussed briefly above, the service provider network 102 can be configured to execute various types of network services. For example, and without limitation, the service provider network 102 can execute a storage service 100 and other network services, some of which are described in greater detail below with regard to FIG. 8. Other network services can provide different types of computing resources and/or functionality. In this regard, it should be appreciated that the network services and the respective computing resources that each provides are merely illustrative and that other types of network services can provide other types of computing resources and functionality in other configurations.

The storage service 100 can provide logical storage units that are accessible to the computing devices 104, to VM instances provided by an on-demand computing service (not shown in FIG. 1) executing in the service provider network 102, and to other computing devices. In order to provide this functionality, the storage service 100 can include software and computing resources that collectively operate to store objects, such as the object 108, using block or file-level storage devices (and/or virtualizations thereof), which might be referred to herein collectively as a data store 106. The objects 108 are files in one configuration.

The logical storage units provided by the storage service 100 can be accessed by the computing devices 104A and 104B shown in FIG. 1. In the example shown in FIG. 1, for instance, the sender computing device 104A is uploading data to the storage service 100 for storage in the data store 106, while the receiver computing device 104B is downloading data from the storage service 100. In order to upload and download data from the storage service 100, the computing devices 104 can issue storage requests to the storage service 100. The storage requests can be read requests, write requests, or other types of requests for accessing objects stored in the logical storage unit. The storage service 100 can expose a network services application programming interface ("API"), a graphical user interface ("GUI"), a command line interface ("CLI") and/or another type of interface for receiving and responding to the storage requests.

Uploads received at an instance of the storage service 100 operating in one data center can be load balanced onto a fleet of front-end web servers (not shown in FIG. 1). The uploaded chunks can then be stored in a back-end data store (not shown in FIG. 1). The contents of the back-end data store can then be replicated to data stores in other data centers located in other locations. Additional details regarding one implementation in which chunks of an object are replicated within a CDN are provided below with regard to FIGS. 5A and 5B.

As discussed briefly above, in the configuration shown in FIG. 1 the storage service 100 can also provide functionality for enabling clients of the storage service 100 to download chunks 110 (which might also be referred to therein as "parts") of an object 108 while other clients are uploading other chunks 110 of the same object 108. For example, and without limitation, in the example shown in FIG. 1, the sender computing device 104A is uploading the chunks 110E-110H of the object 108 at the same time that the receiver computing device 104B is downloading the chunks 110A-110D of the object 108, which were previously uploaded by the sender computing device 104A. In this manner, downloads of objects 108 stored by the storage service 100 can be completed in much less time than in implementations where uploading of all of the chunks 110 of an object 108 must be completed prior to downloading the object 108. Technical benefits other than those specifically mentioned herein can also be realized through an implementation of the disclosed technologies.

In order to provide the functionality described briefly above, the sender computing device 104A is configured to execute an upload module 112 in one particular embodiment. The upload module 112 is a software component that executes on the sender computing device 104A and provides functionality for uploading objects 108 to the storage service 100 for storage. For example, and without limitation, the upload module 112 can upload one or more chunks 110 of an object 108 at a time to the storage service 100. In the example shown in FIG. 1, for instance, the upload module 112 has previously uploaded the chunks 110A-110D to the storage service 100 and is in the process of uploading chunks 110E-110H to the storage service 100. Uploading of the chunks 110I-110N of the object 108 has not yet begun.

As illustrated in FIG. 1, the upload module 112 can also provide data to the storage service 100 that can be utilized by the storage service 100 to keep track of the chunks 110 that have been uploaded (e.g. the chunks 110A-110D), those chunks 110 that are currently uploading (e.g. the chunks 110E-110H), and those chunks 100 that are pending upload (e.g. the chunks 110I-110N). In one configuration, for example, the upload module 112 transmits a manifest 116 for the object 108 to the storage service 100 prior to uploading any of the chunks 110.

The manifest 116 can provide different types of information in different configurations. For example, and without limitation, the manifest 116 can include data 118A that defines the size of an object 108 (e.g. 8192 megabytes ("MB")). The manifest 116 can also include data 118B that defines the size of the chunks 100 of the object 108 (e.g. 64 MB). In one configuration, the storage service 100 utilizes the data 118A and 118B to compute the total number of chunks 110 in the object 108 (e.g. total size divided by chunk size). In another configuration, the manifest 116 also includes data 118C identifying the total number of chunks 110 in the object 108 (e.g. 128 MB). The manifest 116 can include other or alternate data in other configurations. In this regard, it is to be appreciated that the manifest 116 is optional and that, in some configurations, the storage service 100 can determine the total number of chunks 110 in the object 108 in other way.

As will be described in greater detail below, the storage service 100 can utilize data contained in the manifest 116 in order to keep track of the upload status for each of the chunks 110 in an object 108. For example, the storage service 100 maintains upload status data 120 in one configuration. The upload status data 120 includes data 112A indicating the total number of chunks 110 in the object 108, data 122B identifying the chunks 110 of the object 108 that have been completed uploaded to the storage service 110, data 122C identifying the chunks 110 of the object 108 that are in the process of uploading to the storage service 100, and data 122D that identifies the chunks 110 of the object 108 for which uploading has not yet started. The storage service 100 can maintain other types of data regarding the uploading of chunks 110 of an object 108 in other configurations. As will be described in greater detail below with regard to FIG. 3A, the storage service 100 continually updates the upload status data 120 as chunks 110 are completely uploaded and as chunks 110 begin uploading.

The storage service 100 can also expose the upload status data 120 to clients, such as the receiver computing device 104B, through various types of interfaces such as, for instance, a network services API, a CLI, and a GUI. Computing devices can request the upload status data 120 from the storage service 100 by way of an interface, and utilize the upload status data 120 to select and download chunks 110 of an object 108 from the storage service 100 as soon as the chunks 110 have been completely uploaded to the storage service 100. Additional details regarding this process are provided below.

As illustrated in FIG. 1, the receiver computing device 104B is configured with a download module 114 in one embodiment. The download module 114 is a software component that executes on the receiver computing device 104B and manages the downloading of objects 108 from the storage service 100. In order to download an object, the download module 114 first retrieves the current upload status data 120 from the storage service 100. As discussed above, the storage service 100 can expose an API, CLI, or other type of interface through which the receiver computing device 104B can obtain the upload status data 120.

Once the download module 114 has retrieved the upload status data 120, the download module 114 utilizes the data 122B to identify those chunks 110 of the object 108 that have been completely uploaded to the storage service 100. In the example shown in FIG. 1, for instance, the chunks 110A-110D have been completely uploaded to the storage service 100. The download module 114 then initiates a download of one or more of the chunks 110 that have been completely uploaded to the storage service 100 (the chunks 110A-110D in the example shown in FIG. 1). The download module 114 can download the chunks 110 in any order.

The download module 114 can periodically retrieve updated upload status data 120 from the storage service 100, for instance after downloading of one or more of the chunks 110 has been completed. The download module 114 then utilizes the updated upload status data 120 to identify other chunks 110 that can be downloaded and initiates a download of those chunks 110. This process repeats until the download module 114 has downloaded all of the chunks 110 of the object.

Once the download module 114 has downloaded all of the chunks 110 (i.e. as specified by the data 122A) to the receiver computing device 104B, the download module 114 assembles the downloaded chunks 110 (e.g. the chunks 110A-110N in FIG. 1) to form the complete object 108. The download module 114 can provide other functionality such as, but not limited to, decrypting individual chunks 110 and/or decrypting the object 108 in configurations where encryption is utilized.

The download module 114 can also utilized the data 122D that identifies the chunks 110 of the object 108 for which uploading has not yet started in various ways. For example, and without limitation, the total number of chunks 100 and the data 122D can be utilized to compute the percentage of the download that has completed or has yet to be completed. This information can be shown in a GUI or presented in another fashion. The download module 114 can also utilized the data 122D to ensure that sufficient storage capacity is available to store the entire object 108. If sufficient storage capacity is not available for the object, the download module 114 might take steps to obtain additional storage space. The data 122D can be used in other ways in other configurations.

It is to be appreciated that the functionality provided by the download module 114 can be performed at the same time that the upload module 112 on the sender computing device 104A is uploading chunks 110 to the storage service. Additionally, it should also be appreciated that multiple instances of the download module 114 executing on multiple receiver computing devices can be executed simultaneously to download chunks 110 of the object 108 simultaneously.

Additional details regarding the operation of the upload module 112 will be provided below with regard to FIG. 2. Additional details regarding the operation of the storage service 100 will be provided below with regard to FIGS. 3A and 3B. Additional details regarding operation of the download module 114 will be provided below with regard to FIG. 4. In this regard, it is to be appreciated that the operations described with respect to FIG. 2 and FIG. 4 can be performed simultaneously in conjunction with the operations described with respect to FIGS. 3A and 3B in order to enable simultaneously uploading and downloading of an object 108.

As also described briefly above, the computing devices 104 can access the storage service 100 by way of a content distribution network ("CDN") point of presence ("POP") (not shown in FIG. 1) in some configurations. Additional details regarding this configuration will be provided below with regard to FIGS. 5A and 5B.

Figure 2:
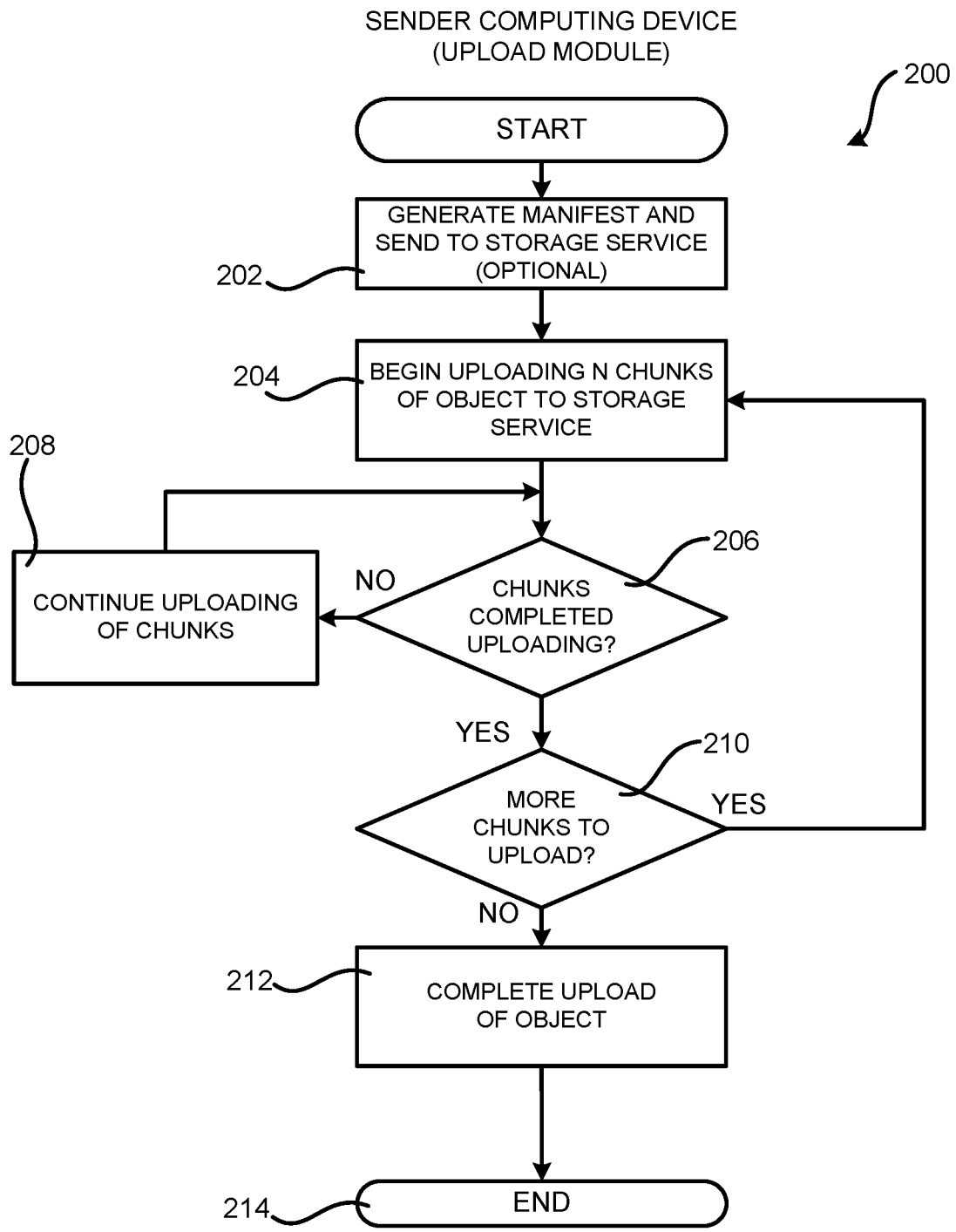
FIG. 2 is a flow diagram showing a routine that illustrates aspects of the operation of a sender computing device configured to operate with the storage service described with reference to FIG. 1, according to one particular configuration.

FIG. 2 is a flow diagram showing a routine 200 that illustrates aspects of the operation of a sender computing device 104A configured to operate with the storage service 100 described with reference to FIG. 1, according to one particular configuration. It should be appreciated that the logical operations described herein with respect to FIG. 2, and the other FIGS., can be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules.

These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 200 begins at operation 202, where the upload module sends the manifest 116 to the storage service 100 for an object 108 to be uploaded. The routine 200 then proceeds to operation 204, where the upload module 112 begins uploading one or more chunks 110 of the object 108 to the storage service 100. In the example shown in FIG. 1, for instance, the upload module 112 is uploading four chunks 110 at a time. Other numbers of chunks 110 can be uploaded simultaneously in other configurations.

From operation 204, the routine 200 proceeds to operation 206, where the upload module 112 determines whether uploading all of chunks 110 that started uploading at operation 204 has completed. If not, the routine 200 proceeds from operation 208, where uploading of the chunks 110 continues. If uploading of all of the chunks 110 that started uploading at operation 204 has completed, the routine 200 proceeds from operation 206 to operation 210.

At operation 210, the upload module 114 determines whether there are additional chunks 110 of the object 108 to be uploaded to the storage service 100. If so, the routine 200 proceeds from operation 210 back to operation 204, where additional chunks 110 of the object 108 can be uploaded to the storage service 100. If all of the chunks 110 have been uploaded to the storage service 100, the routine 200 proceeds from operation 210 to operation 212, where the uploading of the object 108 is completed. The routine 200 then proceeds from operation 212 to operation 214, where it ends.

Figure 3A:
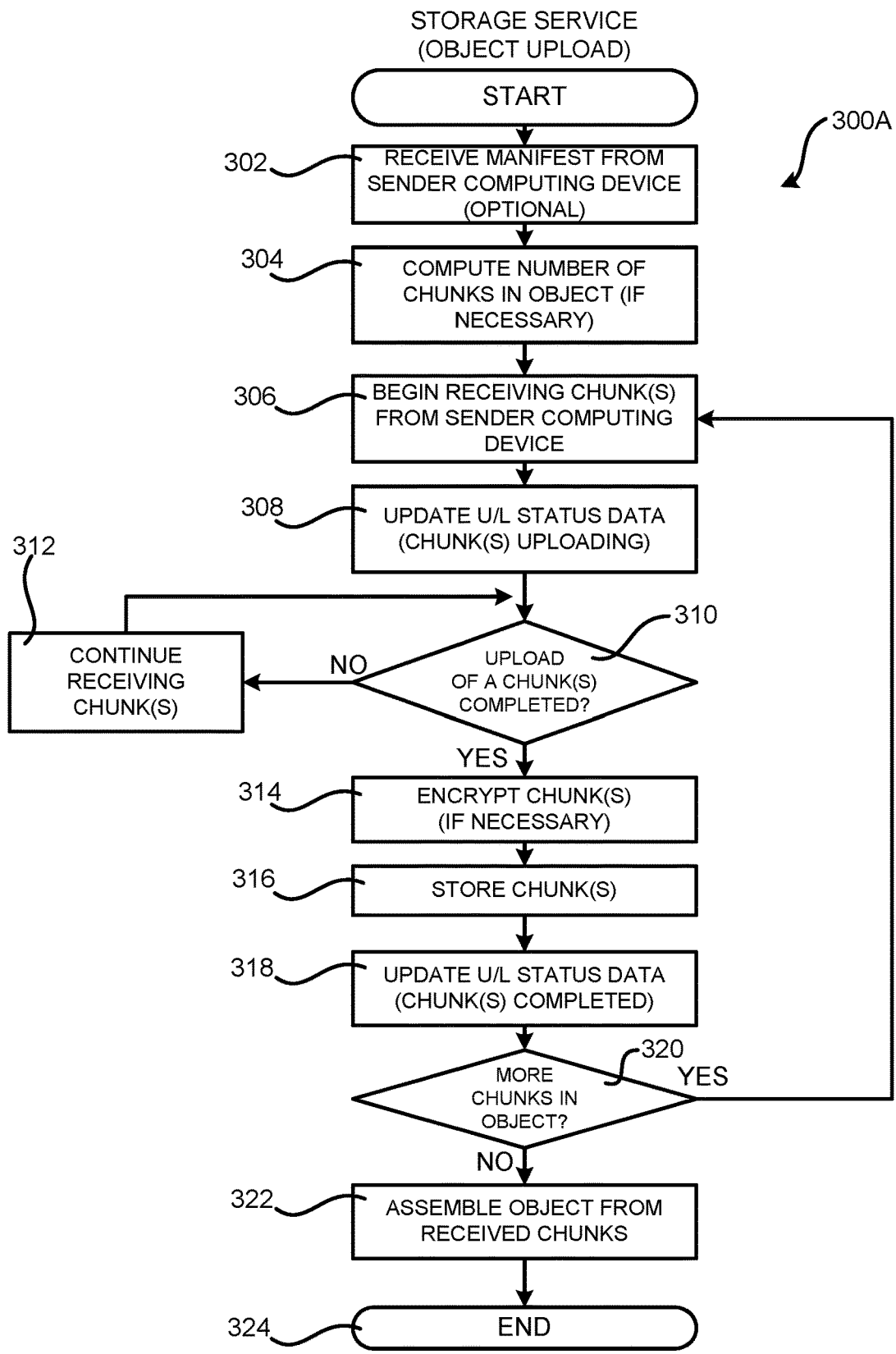
FIGS. 3A and 3B are flow diagrams showing aspects of the operation of the storage service shown in FIG. 1 that is configured to provide functionality for enabling chunks of an object to be downloaded while other chunks of the object are being uploaded, according to one particular configuration.
Figure 3B:
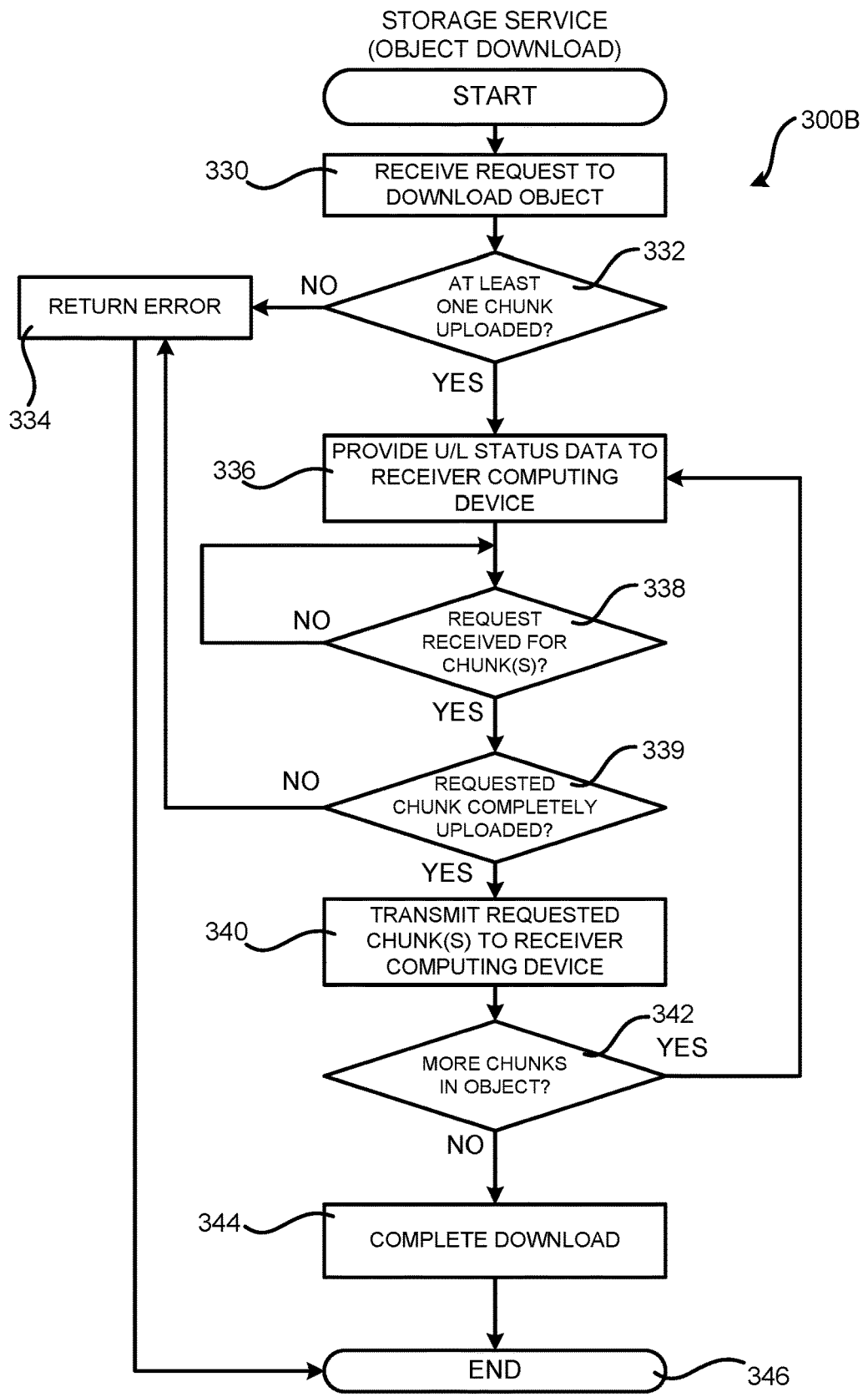

FIGS. 3A and 3B are flow diagrams showing several routines 300A and 300B, respectively, that illustrate aspects of the operation of the storage service 100 shown in FIG. 1, which is configured to provide functionality for enabling chunks 110 of an object 108 to be downloaded while other chunks 110 of the object 108 are being uploaded, according to one particular configuration. In particular, FIG. 3A shows a routine 300A that illustrates aspects of the operation of the storage service 100 for receiving an object 108 from a sender computing device 104A. FIG. 3B shows a routine 300B that illustrates aspects of the operation of the storage service 100 for sending chunks 110 an object 108 to a receiver computing device 104B. Additional details regarding the routines 300A and 300B will be provided below with regard to FIGS. 3A and 3B, respectively.

The routine 300A shown in FIG. 3A begins at operation 302, where the storage service 100 receives a manifest 116 for an object 108 to be uploaded from a sender computing device 104A. The routine 300A then continues from operation 302 to operation 304, where the storage service 100 computes the total number of chunks 110 in the object 108 if necessary. For example, and as described above, the storage service 100 may divide the size of the object 108 as specified by the data 118A by the chunk size as specified by the data 122B in order to determine the number of chunks 110 in the object 108. In other configurations, the manifest 116 includes the data 118C that identifies the total number of chunks 110 in the object 108.

From operation 304, the routine 300 proceeds to operation 306, where the storage service 100 begins receiving one or more chunks 110 of the object 108 from the upload module 112 executing on the sender computing device 104A. Once uploading of one or more chunks 110 has started, the storage service 100 updates the data 122B to indicate that uploading of those chunks 110 has begun at operation 308. The routine 300A then proceeds from operation 310 to operation 310.

At operation 310, the storage service 100 determines if the upload of any chunk 100 of the object 108 has completed. In this regard, it is to be appreciated that various mechanisms can be utilized to determine if a chunk 100 has finished uploading. For example, and without limitation, the storage service 100 can determine the number of chunks in an object 108 (as discussed above) and then determine that a particular chunk has completed uploading when that number of chunks 100 has been received. In other configurations, the sender of the chunks 100 can generated and provide a hash value for an object 108. The storage service 100 can perform a hash of the received chunks 100. The upload of a chunk 100 has completed if the hash value provided by the sender matches the hash value computed by the storage service 100. In a similar manner, the sender can provide a checksum for the object 108. The storage service 100 can then compute a checksum for the chunks 100 as they are received. The upload of a chunk 100 has completed if the checksum provided by the sender matches the checksum computed by the storage service. The hash value and checksum can be provided in the manifest 116. Other mechanisms for determining whether a chunk has completed uploading to the storage service 100 can be utilized in other configurations.

If no chunk 100 has completed uploading, the routine 300A proceeds to operation 312, where uploading of chunks 110 continues. If one or more chunks 110 have completed uploading, the routine 300A proceeds to operation 314, where the received chunk, or chunks, can be encrypted in some configurations. In some configurations, the storage service 100 also provides a notification to the download module 114 executing on the receiver computing device 104B indicating that chunks 110 are available for download. The routine 300A then proceeds to operation 316, where the storage service 100 stores the received chunks 110.

From operation 316, the routine 300A proceeds to operation 318, where the storage service 100 updates the data 122B to identify the chunks 110 for which uploading has completed. The routine 300A then proceeds from operation 318 to operation 320, where the storage service 100 determines whether all of the chunks 110 in the object 108 have completed uploading. The storage service 100 can determine this by comparing the number of received chunks 110 to the data 122A describing the total number of chunks 110 in the object 108.

If all of the chunks 110 of the object 108 have not yet been received, the routine 300A proceeds back to operation 306, where chunks 110 can continue uploading to the storage service 100 in the manner described above. If all of the chunks 110 have completed uploading, the routine 300A proceeds to operation 322. At operation 322, the storage service 100 assembles the object 108 from the received chunks 110. For example, the storage service 100 may arrange the chunks 110 to form a file on the file system of the data store 106. The routine 300A then proceeds from operation 322 to operation 324, where it ends.

The routine 300B shown in FIG. 3B begins at operation 330, where the storage service 100 receives a request from the download module 114 executing on the receiver computing device 104B to download an object 108. The routine 300B then proceeds from operation 330 to operation 332, where the storage service 100 determines whether at least one chunk 110 of the requested object 108 has been uploaded. If not, the routine 300B proceeds from operation 332 to operation 334, where the storage service 100 returns an error in response to the request received at operation 330. The routine then proceeds from operation 334 to operation 346, where it ends.

If at least one complete chunk 110 of the requested object 108 has been received by the storage service 100, the routine 300B proceeds from operation 332 to operation 336. At operation 336, the storage service 100 transmits the upload status data 120 to the download module 114 executing on the receiver computing device 104B. The routine 300B then proceeds to operation 338, where the storage service 100 awaits requests for chunks 110 of the object 108 from the download module 114.

If a request for a chunk 110, or chunks 110, of the object 108 are received, the routine 300B proceeds to operation 339, where the storage service 100 determines whether the requested chunk 110, or chunks 110, have been completely uploaded. The storage service 100 can make this determination based upon the data 122B. If the requested chunk 110, or chunks 110, has not completed uploading, the routine 300B proceeds from operation 339 to operation 334, where an error can be provided to the download module 114 in response to the request for the chunk 110.

If the requested chunk 110, or chunks 110, have been completely uploaded to the storage service 100, the routine 300B proceeds to operation 340, where the storage service 100 transmits the requested chunk 110, or chunks 110, to the download module 114. The routine 300B then proceeds to operation 342, where the storage service 100 determines whether additional chunks 110 of the object 108 remain to be downloaded. If so, the routine 300B proceeds back to operation 336, where additional chunks 110 of the object 108 can be provided to the receiver computing device 104B in the manner described above. If all of the chunks 110 of the object 108 have been provided to the receiver computing device 104B, the routine 300B proceeds from operation 342 to operation 344, where the download of the object 108 is completed. The routine 300B then proceeds to operation 346, where it ends.

Figure 4:
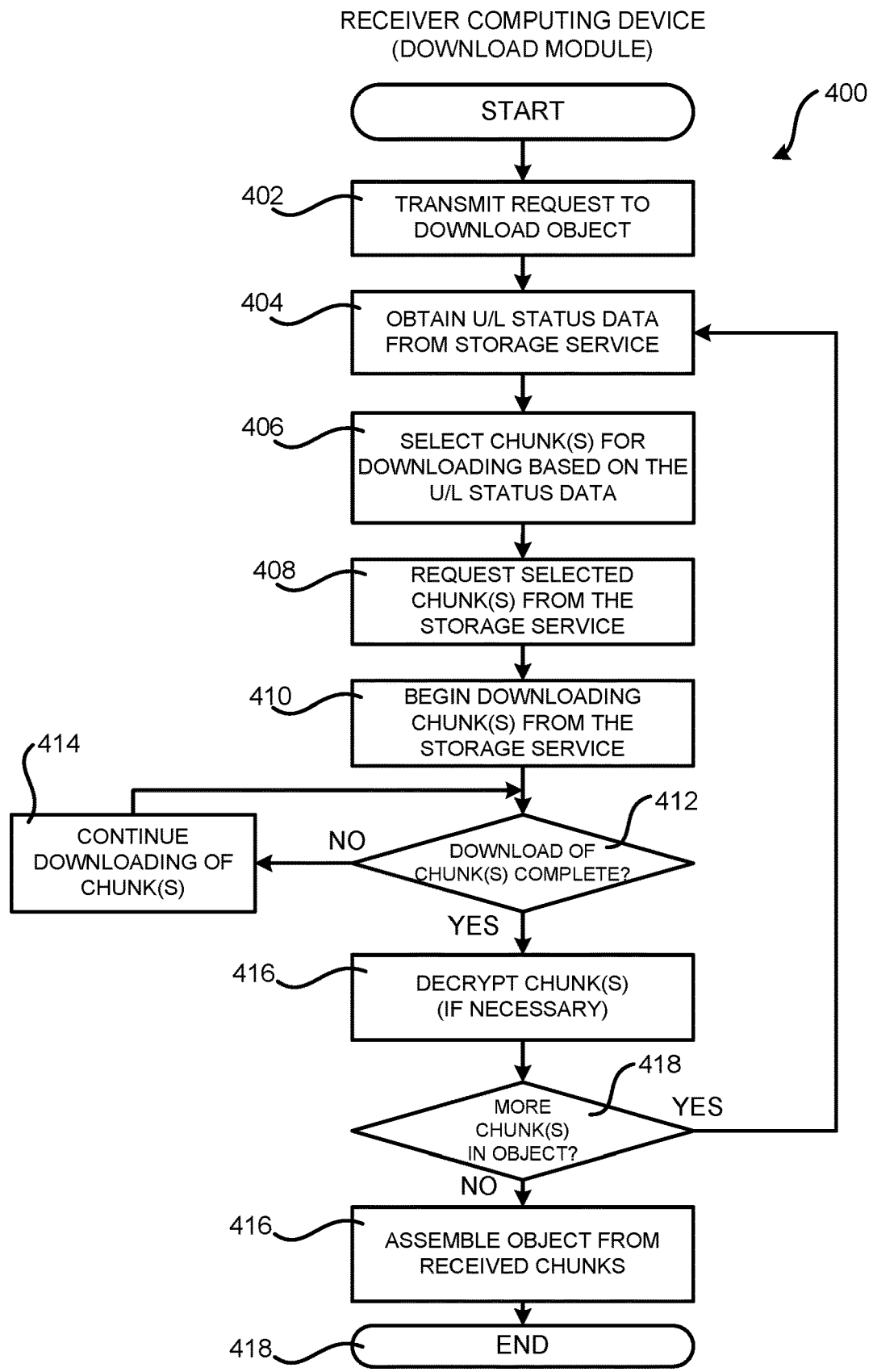
FIG. 4 is a flow diagram showing a routine that illustrates aspects of the operation of a receiver computing device configured to operate with the storage service described with reference to FIG. 1, according to one particular configuration.

FIG. 4 is a flow diagram showing a routine 400 that illustrates aspects of the operation of a receiver computing device 104B configured to operate with the storage service 100 described above with reference to FIG. 1, according to one particular configuration. The routine 400 begins at operation 402, where the download module 114 transmits a request to the storage service 100 to download the object 108. The routine 400 then proceeds to operation 404, where the download module 114 receives the upload status data 120 from the storage service 100.

From operation 404, the routine 400 proceeds to operation 406, where the download module 114 selects one or more chunks 110 of the object for downloading based upon the data 122B in the upload status data 120 that identifies those chunks 110 that have been completely uploaded to the storage service 100. The routine 400 then proceeds from operation 406 to operation 408, where the download module 114 requests the chunks 110 selected at operation 406 from the storage service 100. The requested chunks 110 begin downloading at operation 410.

From operation 410, the routine 400 proceeds to operation 412, where the download module 114 determines whether downloading of the requested chunks 110 has completed. If not, the routine 400 proceeds from operation 412 to operation 414, where downloading of the requested chunks 110 continues. If downloading of the chunks 110 requested at operation 408 has completed, the routine 400 proceeds from operation 412 to operation 416, where the received chunks 110 can be decrypted, if necessary.

From operation 416, the routine 400 proceeds to operation 418, where the download module 114 determines whether the object 108 has additional chunks 108 that remain to be downloaded. This can be determined based upon the number of chunks 110 that have been downloaded and the data 122A identifying the total number of chunks 110 in the object 108.

If additional chunks 110 remain to be downloaded, the routine 400 proceeds back to operation 404, where additional chunks 110 can be downloaded in the manner described above. If no additional chunks 110 remain to be downloaded, the routine 400 proceeds from operation 418 to operation 416, where the download module 114 assembles the complete object from the downloaded chunks 110. For example, the download module 114 might create a file on a file system of the receiver computing device 104B from the chunks 110. The routine 400 then proceeds from operation 416 to operation 418, where it ends.

Figure 5A:
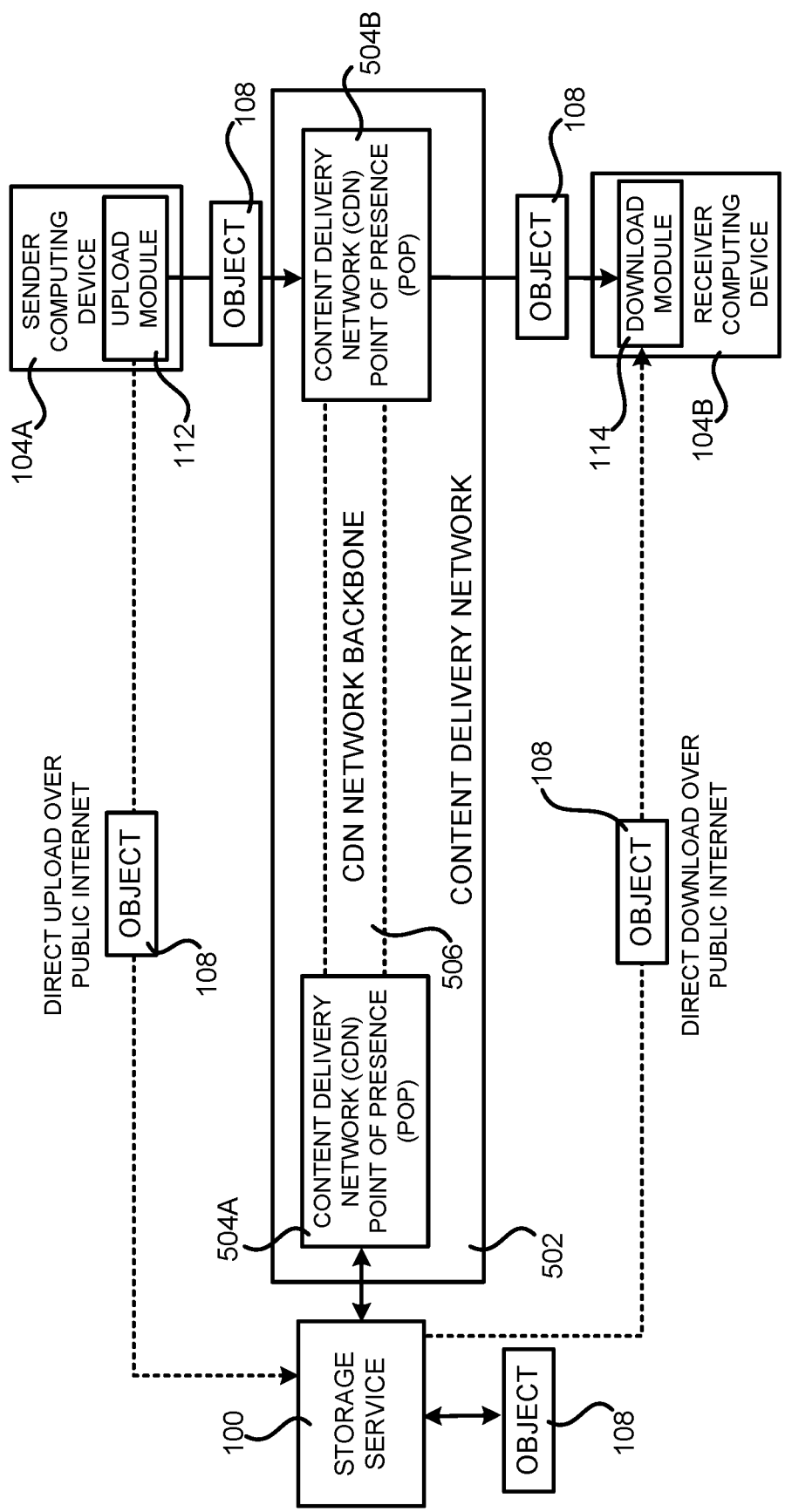
FIGS. 5A and 5B are software and network architecture diagrams showing aspects of the operation of the storage service of FIG. 1 in conjunction with a content delivery network, according to one particular configuration.
Figure 5B:
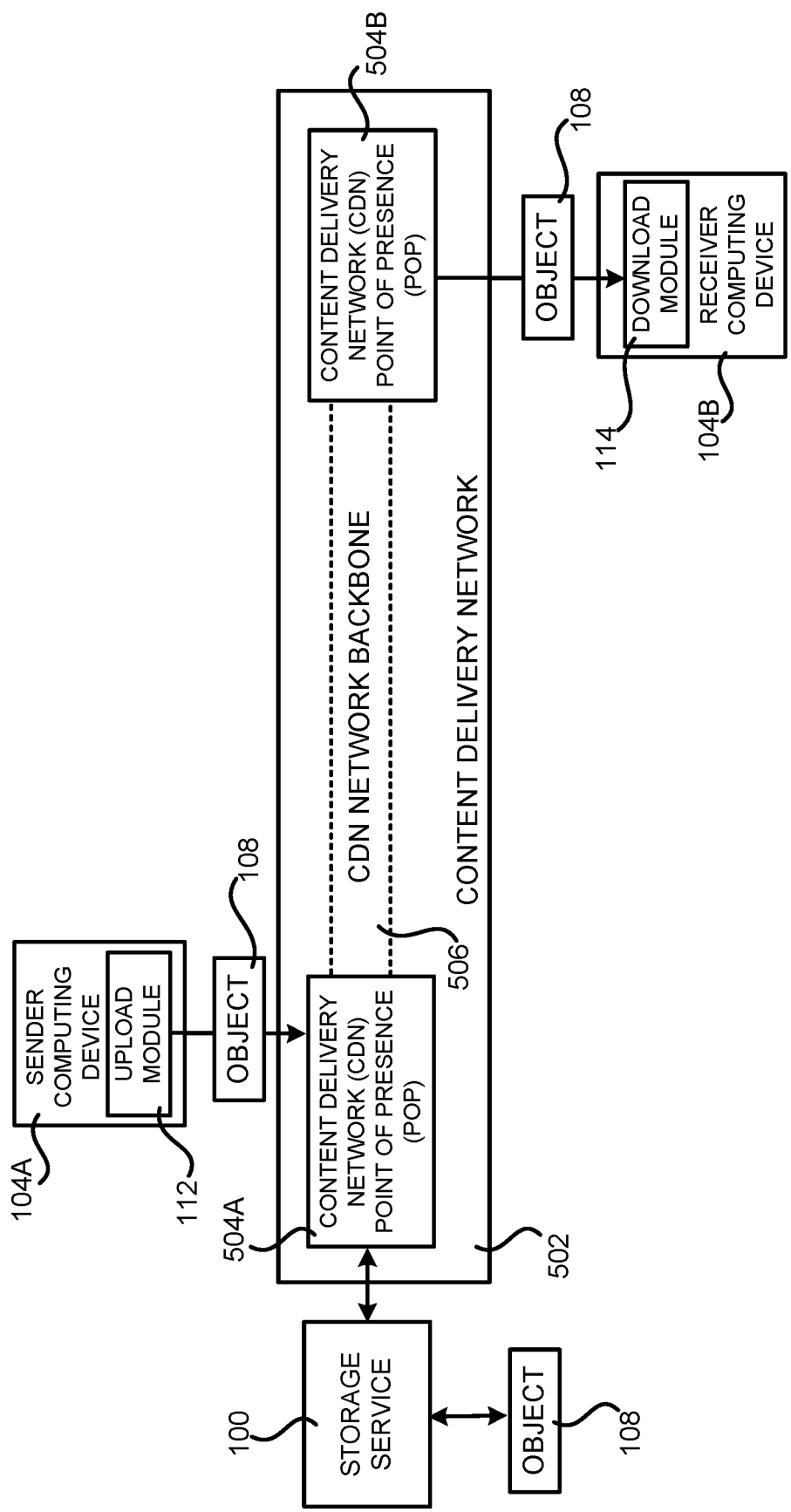

FIGS. 5A and 5B are software and network architecture diagrams showing aspects of the operation of the storage service 100 of FIG. 1 in conjunction with a content delivery network ("CDN") 502, according to one particular configuration. As illustrated in FIG. 5A, in some configurations the sender computing device 104A communicates with the storage service 100 over the public Internet. Similarly, the receiver computing device 104B also communicates with the storage service 100 over the public Internet. Communicating over the public Internet can, however, be very slow, particularly when the sender computing device 104A and/or the receiver computing device 104B are geographically remote (e.g. on another continent) from the storage service 100.

In order to address these considerations, and potentially others, the technologies disclosed herein can be utilized in conjunction with a content delivery network ("CDN") 502 in some configurations. As known to those skilled in the art, a CDN 502 is a distributed (sometimes globally) network of proxy servers deployed in multiple data centers. The goal of a CDN 502 is to serve content to end-users with high availability and high performance. A CDN 502 can include multiple points of presence ("POPs") for accessing the CDN 502. In the example shown in FIG. 5A, the CDN 502 has two POPs 504A and 504B for ease of illustration, but many more POPs are typically utilized in CDNs.

CDNs commonly use one or more network backbones 506 to interconnect the POPs. The network backbone 506 is a high speed network connection that is dedicated to serving POPs 504A and 504B and servers in the CDN 502. The network backbone 506 might, for example, be managed and operated by the same entity that operates the storage service 100. Because the network backbone 506 is dedicated to the CDN 502, the network backbone 506 can be faster than the public Internet, particularly over long distances (e.g. between continents).

In the example configuration shown in FIG. 5A, the sender computing device 104A and the receiver computing device 104B can communicate with the storage service 100 through the CDN 502 rather than through the public Internet, thereby making uploads and downloads of objects 108 to and from the storage service 100 much faster. In order to accomplish this, network traffic to and from the sender computing device 104A and the receiver computing device 104B is routed between several POPs 504A and 504B.

When network traffic is received at the CDN POP 404A that is destined for the storage service 100, the POP 404B can route the traffic to the POP 404A which, in turn, routes the network traffic to the storage service 100. Similarly, traffic received from the storage service 100 that is destined for the sender computing device 104A or the receiver computing device 104B can be routed from the POP 504A to the POP 504B and, ultimately, to its destination.

Additionally, the object 108 can be maintained in a cache of the POP 504B so that when the object 108 is downloaded by the receiver computing device 104B, the object 108 does not need to be retrieved from the storage service 100. In this regard, it is to be appreciated that other objects 108 can be copied from the storage service 100 to the POPs 504A and 504B and stored for later retrieval. In this way, the POPs 504A and 504B can be pre-loaded with objects 108, thereby further reducing the latency and the amount of time required to download the objects 108.

In the example configuration shown in FIG. 5B, the sender computing device 104A is connected to the POP 504A while the receiver computing device 104B is connected to the POP 504B. In this example, the POPs 504A and 504B might be in disparate geographic locations. For instance, the POP 504A might be in the U.S. while the POP 504B is located in Europe.

In the example shown in FIG. 5B, the sender computing device 504A uploads the chunks of the object to the POP 504A for storage at the storage service 100. The receiver computing device 104B can then download the chunks of the object 108 from the storage service 100 by way of the POP 504B in the manner described above. Additionally, the storage service 100 might replicate the chunks of the object 108 to the POP 504B as they are received, and make the chunks of the object 108 downloadable from the POP 504B prior to receiving a request from the receiver computing device 104B to download chunks of the object 108. In this way, chunks of an object 108 can be replicated from a POP 504A in one geographic location to a POP 504B in another geographic location while other chunks of the object 108 are being uploaded (and downloaded), thereby reducing the latency and the amount of time required to download the object 108.

It is to be appreciated that the particular POPs 504 to which an upload of an object is to take place and from which a download of an object 108 is to take place can be determined in several different ways. For example, the sender computing device 104A or the receiver computing device 104B might request a particular POP. The POP 504 to be used for uploading or downloading can also be determined based upon metrics associated with the CDN such as, network throughput, network saturation, network latency, geographic location, and others.

It is also to be appreciated that the network architecture shown in FIGS. 5A and 5B are merely illustrative. Many other types of network topologies can be utilized in other configurations to interconnect the storage service 100, the sender computing device 104A and the receiver computing device 104B.

Figure 6:
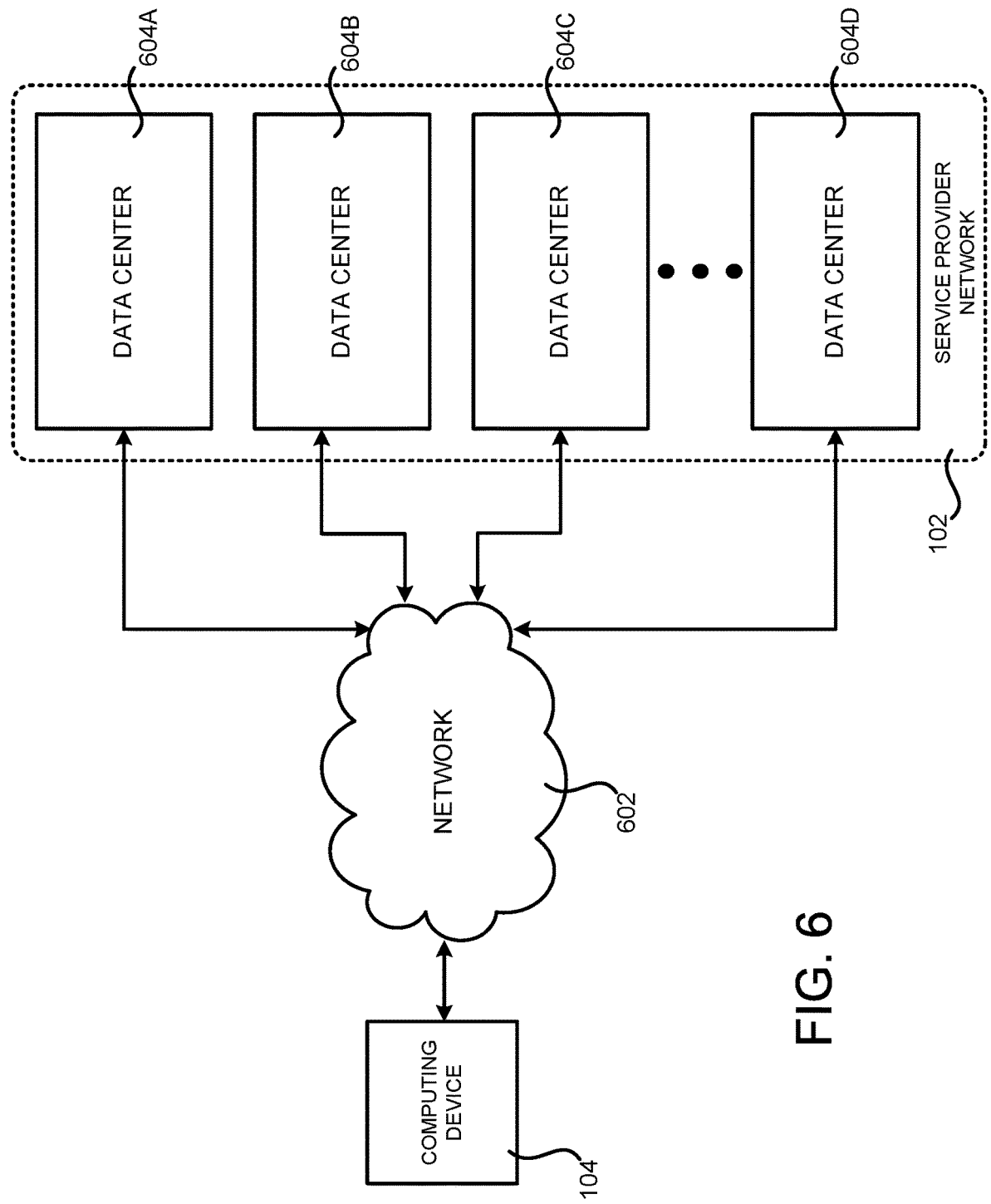
FIG. 6 is a system and network diagram that shows an illustrative operating environment that includes a service provider network that can be configured to implement aspects of the functionality described herein.

FIG. 6 is a system and network diagram that shows one illustrative operating environment for the configurations disclosed herein that includes a service provider network 102 that can be configured to execute the storage service 100 and the other network services described herein, according to one particular configuration. As discussed briefly above, the service provider network 102 can execute network services that provide computing resources on a permanent or an as-needed basis. Among other types of functionality, the computing resources provided by the service provider network 102 can be utilized to implement the various network services described herein. As also discussed above, the computing resources provided by the service provider network 102 can be data storage resources, data processing resources, such as VM instances, networking resources, data communication resources, network services, and other types of resources.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 are enabled in one implementation by one or more data centers 604A-604D (which might be referred to herein singularly as "a data center 604" or collectively as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative configuration for a data center 604 that can be utilized to implement the technologies disclosed herein will be described below with regard to FIG. 7.

The users of the service provider network 102 can access the computing resources provided by the service provider network 102 over a network 602, which can be a wide area communication network ("WAN"), such as the Internet, an intranet or an Internet service provider ("ISP") network or a combination of such networks. For example, and without limitation, a computing device 104 operated by a user of the service provider network 102 can be utilized to access the service provider network 102 by way of the network 602. It should be appreciated that a local-area network ("LAN"), the Internet, or any other networking topology known in the art that connects the data centers 604 to remote customers and other users can be utilized. It should also be appreciated that combinations of such networks can also be utilized.

Figure 7:
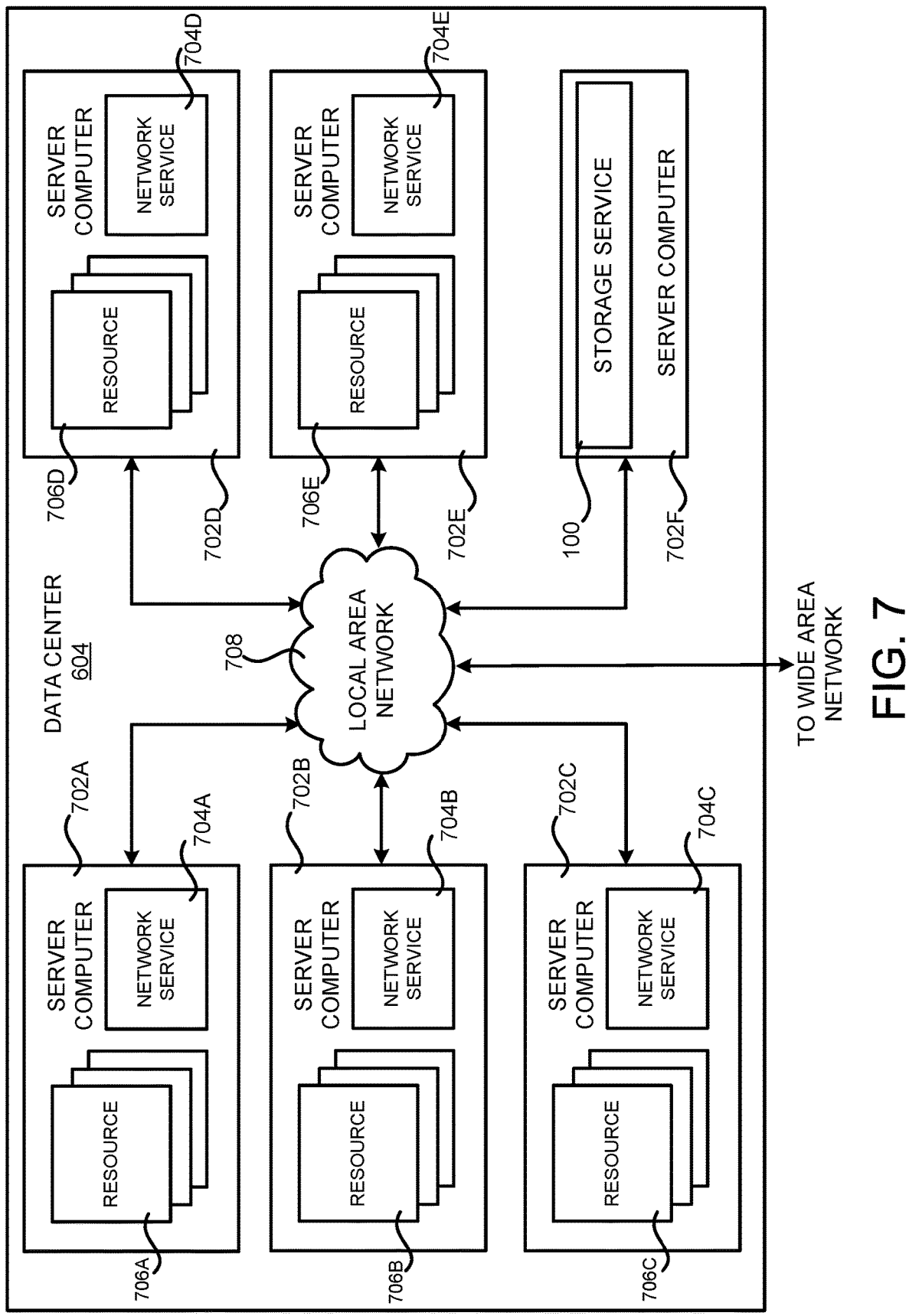
FIG. 7 is a computing system diagram illustrating a configuration for a data center that can be utilized to implement aspects of the technologies disclosed herein.

FIG. 7 is a computing system diagram that illustrates one configuration for a data center 604 that can be utilized to implement the storage service 100 and the other network services disclosed herein. The example data center 604 shown in FIG. 7 includes several server computers 702A-702E (which might be referred to herein singularly as "a server computer 702" or in the plural as "the server computers 702") for providing the computing resources 706A-706E, respectively.

The server computers 702 can be standard tower, rackmount, or blade server computers configured appropriately for providing the various computing resources described herein (illustrated in FIG. 7 as the computing resources 706A-706E). As mentioned above, the computing resources 706 provided by the service provider network 102 can be data storage resources, data processing resources such as VM instances or hardware computing systems, database resources, networking resources, and others. Some of the servers 702 can also be configured to execute network services 704A-704E capable of instantiating, providing and/or managing the computing resources 706, some of which are described in detail herein.

The data center 604 shown in FIG. 7 also includes a server computer 702F that can execute some or all of the software components described above. For example, and without limitation, the server computer 702F can be configured to execute the storage service 100, which was described in detail above. The server computer 702F can also be configured to execute other components and/or to store data for providing some or all of the functionality described herein. In this regard, it should be appreciated that components or different instances of the storage service 100 can execute on many other physical or virtual servers in the data centers 604 in various configurations.

In the example data center 604 shown in FIG. 7, an appropriate LAN 708 is also utilized to interconnect the server computers 702A-702F. The LAN 708 is also connected to the network 602 illustrated in FIG. 6. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 604A-604D, between each of the server computers 702A-702F in each data center 604, and, potentially, between computing resources 706 in each of the data centers 604. It should be appreciated that the configuration of the data center 604 described with reference to FIG. 7 is merely illustrative and that other implementations can be utilized.

Figure 8:
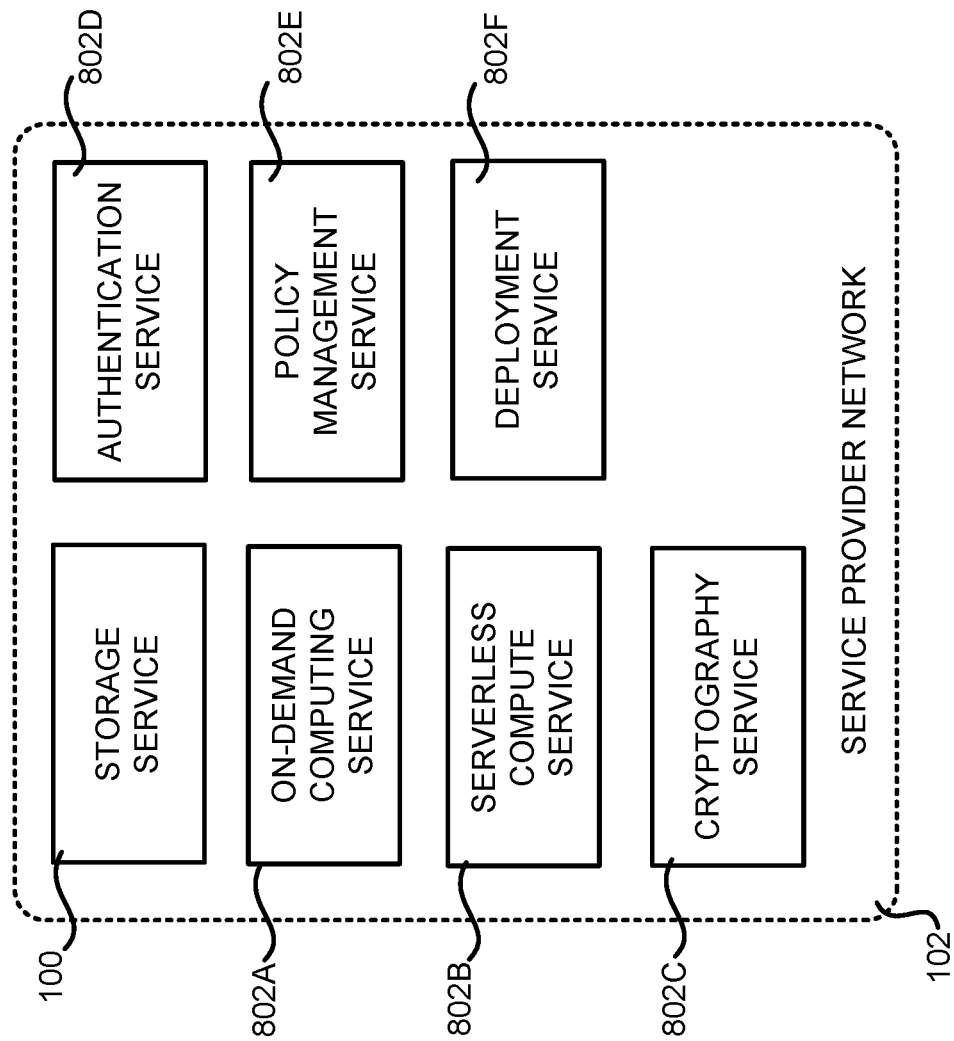
FIG. 8 is a network services diagram that shows aspects of several services that can be provided by and utilized within a service provider network configured to implement the various technologies disclosed herein.

FIG. 8 is a system and network diagram that shows aspects of several network services that can be provided by and utilized within a service provider network 102 in one configuration disclosed herein. In particular, and as discussed above, the service provider network 102 can provide a variety of network services to customers and other users of the service provider network 102 including, but not limited to, the storage service 100, an on-demand computing service 802A, a serverless compute service 802B, a cryptography service 802C, an authentication service 802D, a policy management service 802E, and a deployment service 802F. The service provider network 102 can also provide other types of network services, some of which are described below.

It is to be appreciated that users of the service provider network 102 can include organizations or individuals that utilize some or all of the network services provided by the service provider network 102. As described above users of the service provider network 102 can communicate with the service provider network 102 using an appropriate computing device 104 through a network, such as the network 602 shown in FIG. 6.

It is also noted that not all configurations described include the network services shown in FIG. 8 and that additional network services can be provided in addition to or as an alternative to the services explicitly described herein. Each of the services shown in FIG. 8 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other (e.g., to enable a VM provided by the on-demand computing service 802A to store data in or retrieve data from the storage service 100). Additional details regarding some of the services shown in FIG. 8 will now be provided.

The on-demand computing service 802A can be a collection of computing resources configured to instantiate VM instances and to provide other types of computing resources 706 on demand. For example, a user of the service provider network 102 can interact with the on-demand computing service 802A (via appropriately configured and authenticated API calls, for example) to provision and operate VM instances that are instantiated on physical computing devices hosted and operated by the service provider network 102. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 802A is shown in FIG. 8, any other computer system or computer system service can be utilized in the service provider network 102 to implement the functionality disclosed herein, such as a computer system or computer system service that does not employ virtualization and instead provisions computing resources on dedicated or shared computers/servers and/or other physical devices.

The serverless compute service 802B is a network service that allows users to execute code (which might be referred to herein as a "function") without provisioning or managing server computers in the service provider network 102. Rather, the serverless compute service 802B can automatically run code in response to the occurrence of events. The code that is executed can be stored by the storage service 100 or in another network accessible location. In this regard, it is to be appreciated that the term "serverless compute service" as used herein is not intended to infer that servers are not utilized to execute the program code, but rather that the serverless compute service 802B enables code to be executed without requiring a user to provision or manage server computers. The serverless compute service 802B executes program code only when needed, and only utilizes the resources necessary to execute the code. In some configurations, the user or entity requesting execution of the code might be charged only for the amount of time required for each execution of their program code.

The service provider network 102 can also include a cryptography service 802C. The cryptography service 802C can utilize storage services of the service provider network 102, such as the storage service 100, to store encryption keys in encrypted form, whereby the keys can be usable to decrypt user keys accessible only to particular devices of the cryptography service 802C. The cryptography service 802C can also provide other types of functionality not specifically mentioned herein.

As illustrated in FIG. 8 and discussed above, the service provider network 102, in various configurations, also includes an authentication service 802D and a policy management service 802E. The authentication service 802D, in one example, is a computer system (i.e., collection of computing resources 706) configured to perform operations involved in authentication of users. For instance, one of the services shown in FIG. 8 can provide information from a user to the authentication service 802D to receive information in return that indicates whether or not the requests submitted by the user are authentic.

The policy management service 802E, in one example, is a network service configured to manage policies on behalf of users of the service provider network 102. The policy management service 802E can include an interface (e.g. API or GUI) that enables customers to submit requests related to the management of policy, such as a security policy. Such requests can, for instance, be requests to add, delete, change or otherwise modify policy for a customer, service, or system, or for other administrative actions, such as providing an inventory of existing policies and the like.

The service provider network 102 can additionally maintain other network services based, at least in part, on the needs of its customers. For instance, the service provider network 102 can maintain a deployment service 802F for deploying program code in some configurations. The deployment service 802F provides functionality for deploying program code, such as to virtual or physical hosts provided by the on-demand computing service 802A. Other services include, but are not limited to, database services, object-level archival data storage services, and services that manage, monitor, interact with, or support other services. The service provider network 102 can also be configured with other network services not specifically mentioned herein in other configurations.

Figure 9:
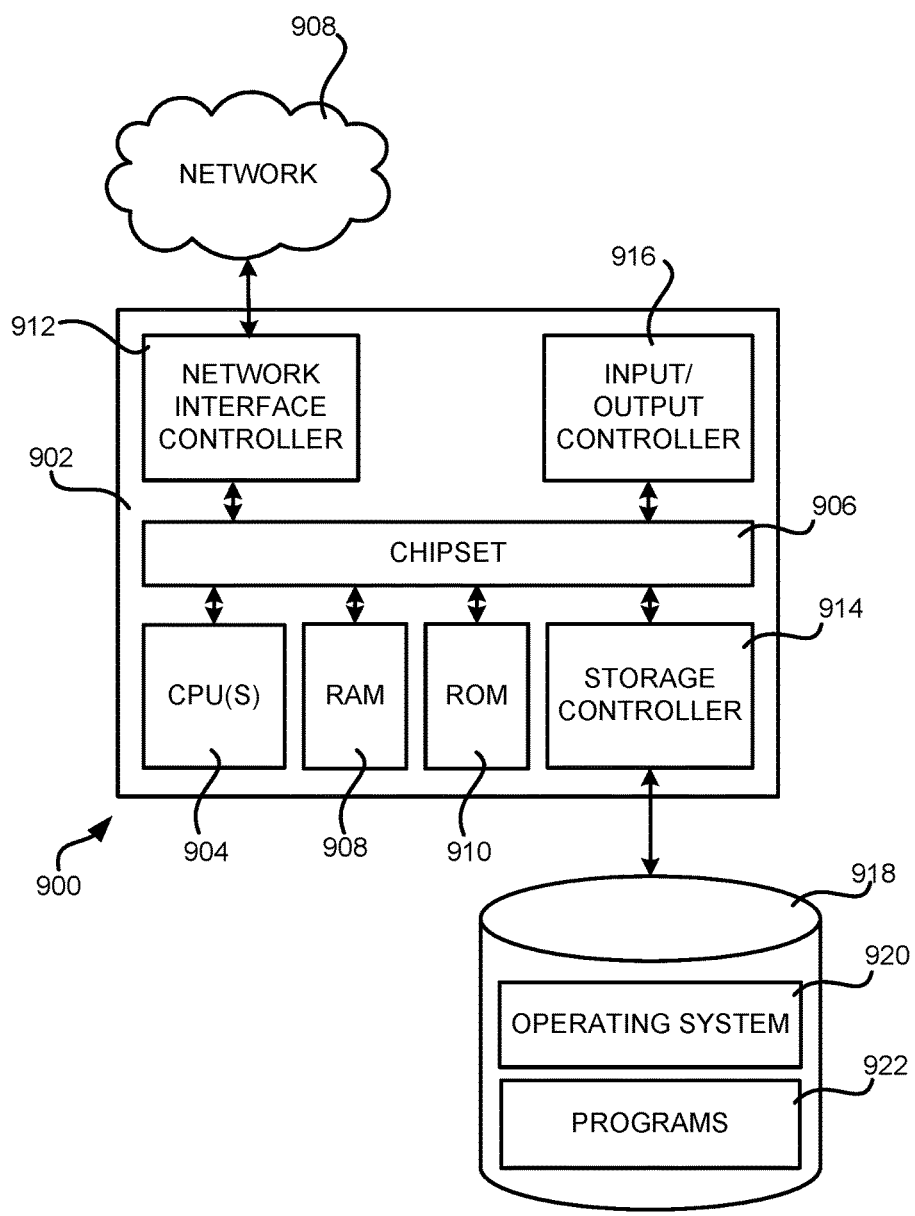
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 908. The chipset 906 can include functionality for providing network connectivity through a NIC 912, such as a gigabit Ethernet adapter. The NIC 912 is capable of connecting the computer 900 to other computing devices over the network 908. It should be appreciated that multiple NICs 912 can be present in the computer 900, connecting the computer to other types of networks and remote computer systems.

The computer 900 can be connected to a mass storage device 918 that provides non-volatile storage for the computer. The mass storage device 918 can store an operating system 920, programs 922, and data, which have been described in greater detail herein. The mass storage device 918 can be connected to the computer 900 through a storage controller 914 connected to the chipset 906. The mass storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 918 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 918 is characterized as primary or secondary storage, and the like.

For example, the computer 900 can store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 918 can store an operating system 920 utilized to control the operation of the computer 900. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 918 can store other programs and data utilized by the computer 900.

In one configuration, the mass storage device 918 or other computer-readable storage media is encoded with computer-executable instructions which, when loaded into the computer 900, transform the computer from a general-purpose computing system into a special-purpose computer capable of implementing the configurations described herein. These computer-executable instructions transform the computer 900 by specifying how the CPUs 904 transition between states, as described above. According to one configuration, the computer 900 has access to computer-readable storage media storing computer-executable instructions which, when executed by the computer 900, perform the various processes described above with regard to FIGS. 1-5. The computer 900 can also include computer-readable storage media for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or can utilize an architecture completely different than that shown in FIG. 9.

Based on the foregoing, it should be appreciated that technologies for enabling chunks of an object to be downloaded from a storage service while other chunks of the object are being uploaded have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system, comprising:
one or more processors; and
at least one non-transitory computer-readable storage medium having instructions stored thereupon which, when executed by the one or more processors, cause the system to:
store, by way of a storage service executing in a service provider network, first data identifying a total number of chunks of an object, second data identifying the chunks of the object that have been completely uploaded to the storage service, third data identifying the chunks of the object that are uploading, and fourth data identifying the chunks of the object that are pending upload to the storage service;
update the third data identifying the chunks of the object that are uploading and the fourth data identifying the chunks of the object that are pending upload to the storage service in response to a start of an upload of a chunk of the object to the storage service;
update the second data identifying the chunks of the object that have been completely uploaded to the storage service and the fourth data identifying the chunks of the object that are pending upload to the storage service in response to a completion of the upload of the chunk of the object to the storage service;
receive a first request from a receiver computing device to download the object from the storage service during an upload of the object to the storage service;
responsive to the request, utilize the second data identifying the chunks of the object that have been completely uploaded to the storage service to determine that at least one chunk of the object has been completely uploaded to the storage service;
responsive to determining that at least one chunk of the object has been completely uploaded to the storage service, send at least the second data to the receiver computing device;
receive a second request from the receiver computing device to download a first chunk of the object identified within the second data from the storage service; and
initiate the download of the first chunk of the object to the receiver computing device from the storage service during the upload of at least one other chunk of the object to the storage service.

2. The system of claim 1, wherein to send the second data to the receiver comprises to expose the first data identifying the total number of chunks of the object, the third data identifying the chunks of the object that are uploading, and the fourth data identifying the chunks of the object that are pending upload to the storage service by way of a network services application programming interface (API).

3. The system of claim 1, wherein the instructions further cause the system to:
determine whether all of the chunks of the object have been uploaded based upon the first data identifying the total number of chunks of the object and the second data identifying the chunks of the object that have been completely uploaded to the storage service; and
responsive to determining that all of the chunks of the object have been uploaded, assemble the object from the chunks of the object.

4. The system of claim 1, wherein the first data identifying the total number of chunks of the object, fifth data identifying a size of the chunks, and sixth data identifying a size of the object are provided to the storage service by a sender computing device uploading the chunks to the storage service.

5. The system of claim 1, wherein the instructions further cause the system to:
upload chunks of the object to the storage service by way of a first point of presence (POP) at a first geographic location within a content distribution network (CDN), and
replicate the chunks of the object to a second POP at a second geographic location within the CDN.

6. The system of claim 5, wherein the first chunk of the object is downloaded by way of the second POP.

7. The system of claim 1, wherein the instructions further cause the system to to receive a manifest from a sender computing device uploading the chunks of the object to the storage service, the manifest comprising fifth data identifying a size of the chunks, sixth data identifying a size of the object, and a checksum or hash value for the object.

8. A computer-implemented method, comprising:
storing, by way of a storage service executing in a service provider network, first data identifying a total number of chunks of an object and second data identifying the chunks of the object that have been completely uploaded to the storage service;
receiving from a downloading device a first request to download the object from the storage service during an upload of the object to the storage service;
responsive to the request, utilizing the second data identifying the chunks of the object that have been completely uploaded to the storage service to determine that at least one chunk of the object has been completely uploaded to the storage service;
responsive to determining that the at least one chunk of the object has been completely uploaded to the storage service, exposing the second data to the downloading device by way of a network services application programming interface (API);
receiving from the downloading device a second request to download a first chunk of the object identified within the second data from the storage service; and
responsive to the second request, downloading the first chunk of the object from the storage service during the upload of at least one other chunk of the object to the storage service.

9. The computer-implemented method of claim 8, wherein exposing the second data further comprises:
exposing the first data identifying the total number of chunks of the object, third data identifying the chunks of the object that are uploading, and fourth data identifying the chunks of the object that are pending upload to the storage service.

10. The computer-implemented method of claim 8, further comprising:
determining whether all of the chunks of the object have been uploaded based upon the first data identifying the total number of chunks of the object and the second data identifying the chunks of the object that have been completely uploaded to the storage service; and
responsive to determining that all of the chunks of the object have been uploaded, assembling the object from the chunks of the object.

11. The computer-implemented method of claim 8, further comprising:
receiving the first data identifying the total number of chunks of the object, fifth data identifying a size of the chunks, and sixth data identifying a size of the object from a computing device uploading the chunks to the storage service.

12. The computer-implemented method of claim 8, further comprising:
receiving the chunks of the object at the storage service by way of a first point of presence (POP) at a first geographic location within a content distribution network (CDN); and
replicating the chunks of the object to a second POP at a second geographic location within the CDN.

13. The computer-implemented method of claim 12, wherein the first chunk of the object is downloaded by way of the second POP.

14. The computer-implemented method of claim 8, further comprising:
receiving a manifest from a computing device uploading the chunks of the object to the storage service, the manifest comprising fifth data identifying a size of the chunks, sixth data identifying a size of the object, and a checksum or hash value for the object.

15. A non-transitory computer-readable storage medium having instructions stored thereupon which are executable by a processor and which, when executed, cause the processor to:
store, by way of a storage service executing in a service provider network, first data identifying a total number of chunks of an object and second data identifying the chunks of the object that have been completely uploaded to the storage service;
receive from a downloader a first request to download the object from the storage service during an upload of the object to the storage service;
responsive to the request, utilize the second data identifying the chunks of the object that have been completely uploaded to the storage service to determine that at least one chunk of the object has been completely uploaded to the storage service;
responsive to determining that the at least one chunk of the object has been completely uploaded to the storage service, expose the second data to the downloader by way of a network services application programming interface (API);
receive from the downloader a second request to download a first chunk of the object identified within the second data from the storage device; and
responsive to the second request, download the first chunk of the object during the upload of at least one other chunk of the object to the storage service.

16. The non-transitory computer-readable storage medium of claim 15, further comprising instructions stored thereupon, which when executed, expose the first data identifying the total number of chunks of the object, third data identifying the chunks of the object that are uploading, and fourth data identifying the chunks of the object that are pending upload to the storage service by way of the API.

17. The non-transitory computer-readable storage medium of claim 15, further comprising instructions stored thereupon, which when executed:
determine whether all of the chunks of the object have been uploaded based upon the first data identifying the total number of chunks of the object and the second data identifying the chunks of the object that have been completely uploaded to the storage service; and
responsive to determining that all of the chunks of the object have been uploaded, assemble the object from the chunks of the object.

18. The non-transitory computer-readable storage medium of claim 15, further comprising instructions stored thereupon, which when executed:
receive the first data identifying the total number of chunks of the object, fifth data identifying a size of the chunks, and sixth data identifying a size of the object from a computing device uploading the chunks to the storage service.

19. The non-transitory computer-readable storage medium of claim 15, further comprising instructions stored thereupon, which when executed:
receive a manifest from a computing device uploading the chunks of the object to the storage service, the manifest comprising fifth data identifying a size of the chunks, and sixth data identifying a size of the chunks of the object, and a checksum or hash value for the object.

20. The non-transitory computer-readable storage medium of claim 15, further comprising instructions stored thereupon, which when executed:
receive the chunks of the object at the storage service by way of a first point of presence (POP) at a first geographic location within a content distribution network (CDN); and
replicate the chunks of the object to a second POP at a second geographic location within the CDN for the downloading.

* * * * *